DATA TRANSMISSION ERROR CHECKING ARRANGEMENT

Filed April 17, 1968 2 Sheets-Sheet 1

INVENTORS B. E. BRILEY
V. HACHENBURG
BY Daniel E. Foster
ATTORNEY

United States Patent Office 3,523,279

Patented Aug. 4, 1970

3,523,279

DATA TRANSMISSION ERROR CHECKING ARRANGEMENT

Bruce E. Briley, Countryside, and Victor Hachenburg, Naperville, Ill., assignors to Bell Telephone Laboratories, Incorporated, Murray Hill, N.J., a corporation of New York Filed Apr. 17, 1968, Ser. No. 722,108
Int. Cl. G06f *11/00;* G08b *29/00*
U.S. Cl. 340—146.1 7 Claims

ABSTRACT OF THE DISCLOSURE

Disclosed herein is an arrangement for checking the contents of a destination register against the contents of a source register after a transfer of information between the registers has been performed over a single-rail data bus. The complement of the source register contents is gated onto the bus simultaneously with the true contents of the destination register and the bus is checked for the presence of any binary "0's." The complement of the destination register contents is then gated onto the bus simultaneously with the true contents of the source register and the bus is again checked for the presence of any binary "0's." The detection of any binary "0's" on the bus during either of the checking operations indicates a mismatch between the information in the source register and the information in the destination register.

BACKGROUND OF THE INVENTION

Field of the invention

Figure 1:
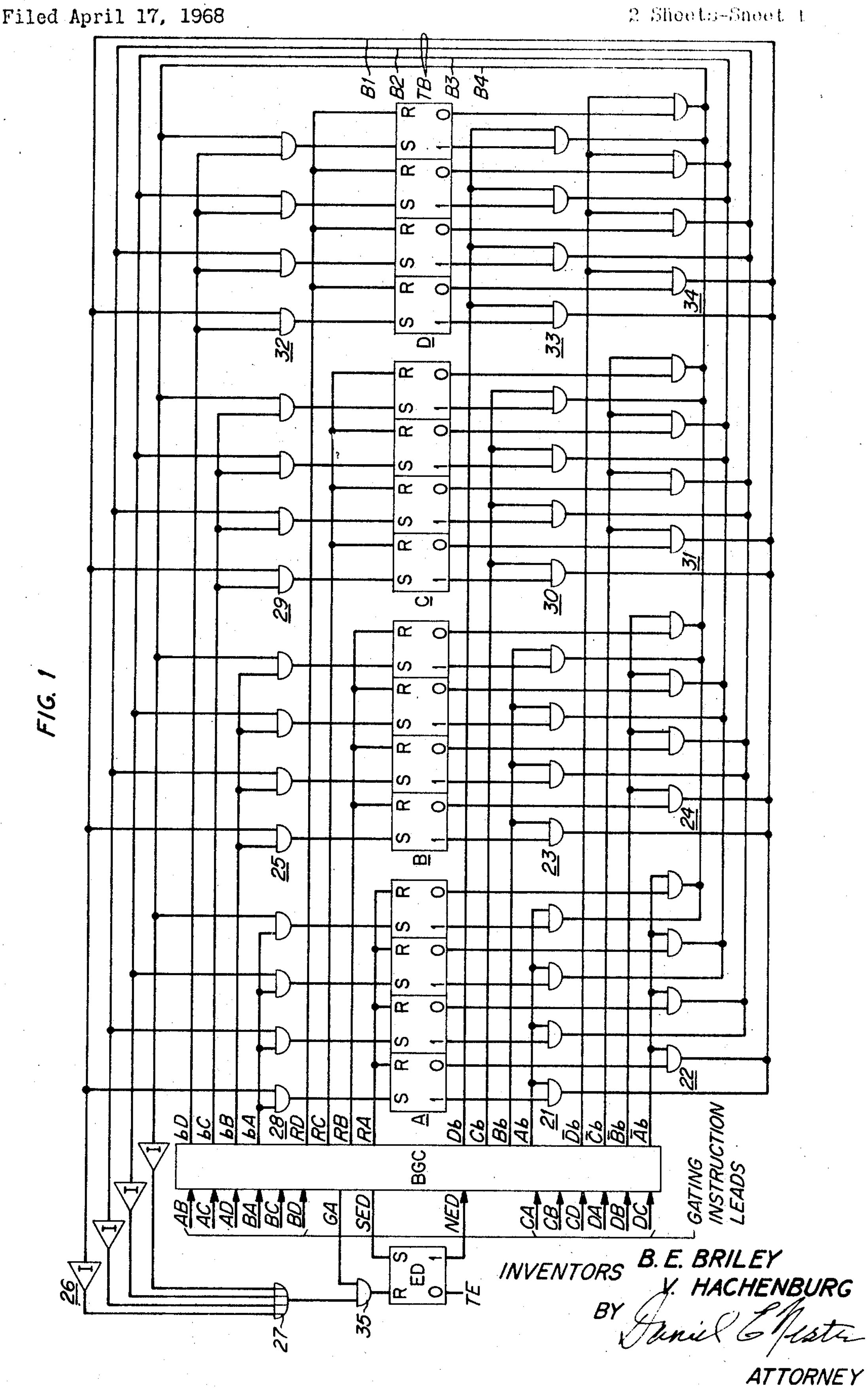

The data transmission error checking arrangement described herein can be employed advantageously to verify accurate transfer of data from one location to another in information transfer systems and particularly in data processing arrangements wherein transfer of data and instructions from one location to another is a frequent occurrence in the course of executing various data processing functions.

Description of the prior art

Transfer of data between registers is a common occurrence in many data processing applications. Where such a data transfer is not accurate, erroneous processing results will occur. Accordingly, most data processors employ some type of checking arrangement to assure the accurate transmission of data between a data source and destination.

Examples of data transmission checking arrangements include the implementation of an EXCLUSIVE-OR logic function on the contents of a data source and a data destination. The result of the EXCLUSIVE-OR function indicates whether or not the data contained in the data source and the data contained in the data destination are identical. This type of matching circuit arrangement requires an EXCLUSIVE-OR logic circuit for each data bit transmitted plus additional logic gates for each possible data source and data destination. In this type of arrangement the output gates of the data source are not checked for accuracy of data transmission.

Another arrangement for checking the accuracy of data transmission employs the well-known parity checking function. However, this type of checking arrangement does not insure a complete match between the contents of a data source and the contents of a data destination.

Some data transmission arrangements provide a separate transmission channel for each possible value of each data bit transmitted. For example, if the transmitted data is in binary form, two transmission channels are provided for each data bit; a signal on one channel representing a binary "1" and a signal on the other channel representing a binary "0." Data transmitted in this manner is designated as being in a double-rail format. Another method of transmitting binary data is to provide only a single transmission channel for each data bit to be transmitted. The presence of a signal on the transmission channel represents a data bit of one binary value and the absence of a signal from the transmission channel represents a data bit of the other binary value. For example, a signal on the transmission channel can represent a binary "1" and the absence of a signal from that channel can represent a binary "0." Data transmitted in this way is designated as being in a single-rail format.

The performance of the aforenoted EXCLUSIVE-OR logic function requires a double-rail data input. Where a single-rail transmission arrangement is used, a double-rail input from the transmission arrangement to an EXCLUSIVE-OR logic circuit is not available. Accordingly, a true matching operation cannot be performed.

The problem to which this invention is directed is the performance of a complete matching operation between the contents of a data source and a data destination between which information is transmitted in a single-rail format.

BRIEF SUMMARY OF THE INVENTION

It is an object of this invention to compare the contents of a destination register with the contents of a source register after a transfer of information between the registers has been performed over a data bus in a single-rail format.

It is a further object of this invention to accomplish the aforenoted data comparison with a minimum of circuitry.

A still further object of this invention is the incorporation in the aforenoted data comparison operation of a functional check upon the output gates from the source register, the input gates of the destination register, the output gates of the destination register, and upon the ability of the destination register to hold information after the input gating signal is removed from the input gates of the destination register.

In accordance with one specific illustrative embodiment of the invention, following the transfer of information between a source register and a destination register over a single-rail data bus, the complement of the source register contents is gated onto the bus simultaneously with the true contents of the destination register and the bus is checked for the presence of any binary "0's." The complement of the destination register contents is then gated onto the bus simultaneously with the true contents of the source register and the bus is again checked for the presence of any binary "0's." The detection of any binary "0's" on the bus during either of the checking operations indicates a mismatch between the information in the source register and the information in the destination register.

Figure 2:
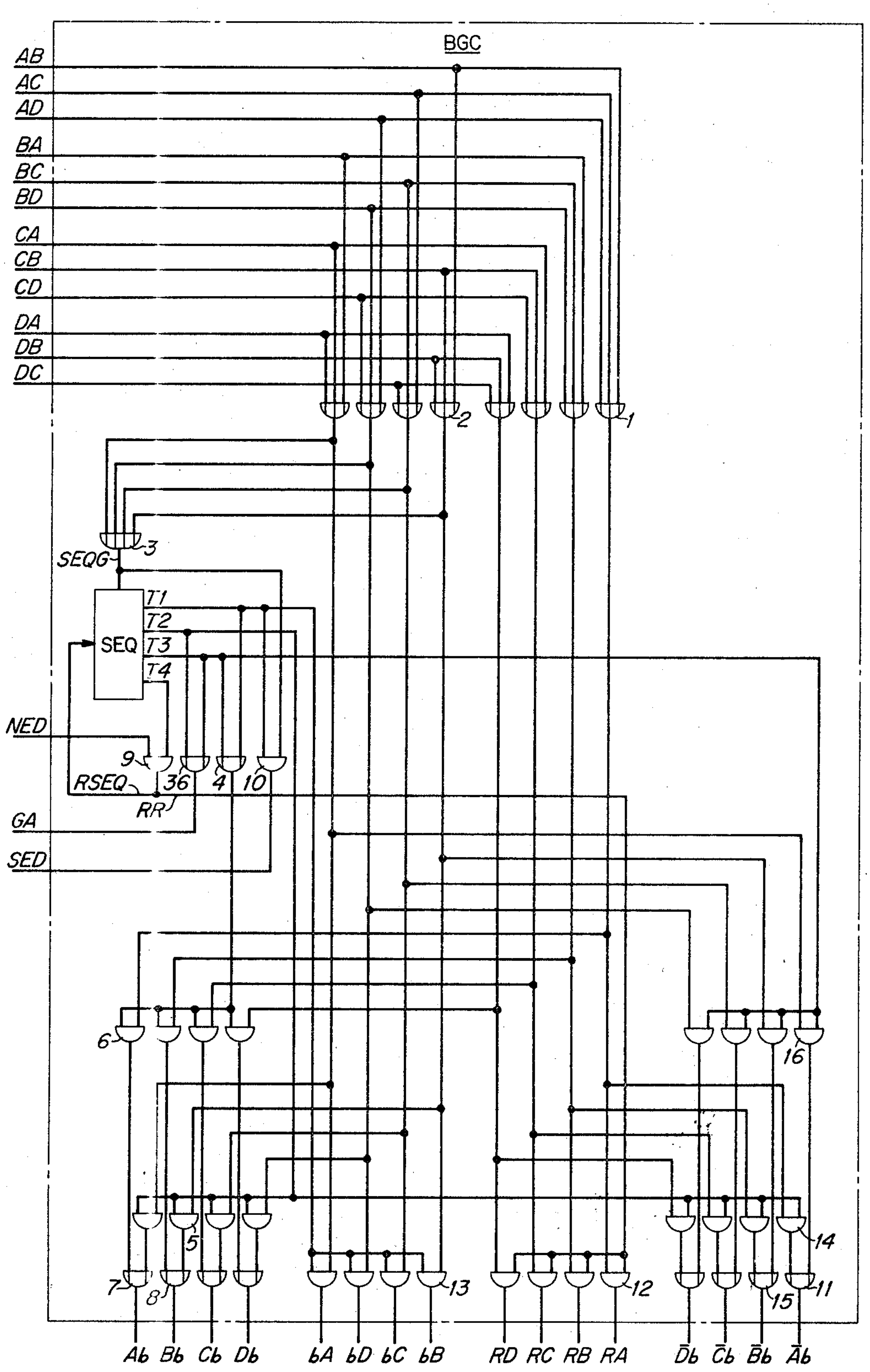

The above and other objects and features of the invention will be more apparent when the following description is read with reference to the drawing in which:

FIG. 1 illustrates a single-rail bus and gating system for transmitting data between selected registers and a transmission error checking arrangement associated with the single-rail bus; and FIG. 2 illustrates an exemplary bus gating control arrangement which can be used to implement and cotnrol both the transmission of data between selected registers over the bus arrangement of FIG. 1 and the checking of the source and destination register contents after data is transmitted therebetween.

The data transmitting arrangement illustrated in FIG. 1 may comprise a portion of a data processor in which information is transferred between selected registers during various data processing operations. The equipment for gating data from other sources into the registers of FIG. 1 is not shown since it is unnecessary for an understanding of this invention.

Each of the registers A, B, C and D in FIG. 1 comprises binary storage elements for storing four bits of binary information. These storage elements can comprise flip-flops or any other well-known bistable storage element. A data transmission bus TB comprising four conductors B1, B2, B3 and B4 provides a four-bit single-rail data transmission path between the registers A, B, C and D. Each of the registers A, B, C and D is equipped with input gates 28, 25, 29 and 32, respectively, for transferring information from the bus TB to the register. Each of the registers A, B, C and D is equipped with a first set of output gates 21, 23, 30 and 33, respectively, for transferring the true contents of the register to the data bus TB. Each of the registers A, B, C and D is equipped with a second set of output gates 22, 24, 31 and 34, respectively, for transferring the complement of the contents of the register to the data bus TB. The logical condition of data bus TB is thus determined by the logical sum (OR function) of the outputs from all the AND gates 21, 23, 30, 33, 22, 24, 31 and 34 having their outputs connected to the bus TB.

The input and output gates 28, 25, 29, 32, 21, 22, 23, 24, 30, 31, 33 and 34 are controlled by a bus gating control arrangement BGC. Gating control leads, e.g., *b*D, *b*C, *b*B, *b*A, D*b*, etc., connect control BGC with the register input and output gates. Conductors RA, RB, RC and RD connect control BGC with the RESET control terminals of the binary storage elements of registers A, B, C and D, respectively. A signal on one of these conductors causes binary "0's" to be entered into all the binary storage elements of the register to which the conductor is connected.

Bus gating control BGC receives input signals over gating instruction leads AB, AC, AD, BA, BC, BD, etc., which define the source register and the destination register between which data is to be transmitted. Signals on these gating instruction leads can be advantageously provided either from an instruction decoder in a data processor or from other selection arrangements. Each of the gating instruction leads is designated so as to define a source register and a destination register for a data transfer operation. The initial letter of the designation defines the source register and the second letter of the designation defines the destination register. For example, a signal on conductor AD indicates to gating control BGC that the contents of register A are to be transferred to register D.

The conductors B1, B2, B3 and B4 of data bus TB are each connected through one of the inverters 26 as inputs to OR gate 27. Thus, whenever a binary "0" is indicated by the absence of a signal from any one of the conductors B1, B2, B3 or B4, an output signal is supplied by OR gate 27. The function of error detection flip-flop ED will be described later herein.

FIG. 2 illustrates one type of gating control arrangement BGC which can be used to implement and control the transfer of information between the registers A, B, C and D of FIG. 1 and to initiate and control the comparison of the contents of a source and destination register when the transfer operation has been completed. The gating instruction leads AB, AC, AD, etc., discussed above, provide gating instruction signals to control BGC. A signal on any one of these gating instruction leads activates sequencer SEQ through OR gate 3. Activation of sequencer SEQ initiates the data transfer operation called for by the energized instruction lead.

Sequencer SEQ can comprise any well-known sequence circuit having the capability of advancing from an inactive initial state through four active states and returning to the inactive initial state. Sequencer SEQ can be synchronous or asynchronous. If synchronous, a source of timing pulses would be incorporated in sequencer SEQ. If asynchronous, sequencer SEQ would be controlled by operation completed signals from the various operative circuits over which it exerts control. No details of sequencer SEQ are included herein since such details are unnecessary to an understanding of the invention.

DETAILED DESCRIPTION

The following description of a data transfer operation between registers A and B illustrates the principles of the invention as implemented by the specific illustrative embodiment shown in FIGS. 1 and 2.

It is assumed that a gating instruction signal is received by control BGC on conductor AB. This signal indicates that the data contained in register A is to be transferred to register B. As indicated on FIG. 2, conductor AB is connected as an input to OR gate 2 and the output of OR gate 2 is connected as an input to OR gate 3. Consequently, the signal on conductor AB is transmitted through OR gates 2 and 3 and appears as a start signal on conductor SEQG. A signal on conductor SEQG causes sequencer SEQ to advance from its inactive initial state to its first active state and thereby place an output signal on conductor T1.

During the time that conductor T1 is energized by sequencer SEQ, the data contained in register A will be gated to the bus TB, the data on bus TB will be gated into register B, and error detector flip-flop ED will be SET. Conductor T1 is connected as one input to OR gate 4. Accordingly, the signal on conductor T1 is transmitted through OR gate 4 and appears as one input to AND gate 6. The signal on conductor AB is transmitted through OR gate 1 and appears on the other input of AND gate 6. As a result, an output signal is provided by AND gate 6 which is transmitted through OR gate 7 and appears as a gating control signal on conductor A*b*.

Referring now to FIG. 1, conductor A*b* is connected as one input to each of the AND gates 21. The other input of each of the AND gates 21 is connected to the true or "1" output terminal of the respective binary storage elements of register A. When conductor A*b* is energized by control BGC, AND gates 21 place signals on those conductors B1, B2, B3 and B4 of bus TB which correspond to the binary storage elements of register A having a binary "1" stored therein. For example, if the data word stored in register A is 1010, conductors B1 and B3 will have signals placed thereon when the AND gates 21 are enabled by a signal on conductor A*b*.

As indicated on FIG. 2, the output of OR gate 2 also is connected as an input to AND gate 13. Conductor T1 is connected as the other input to AND gate 13. Consequently, the signal on conductor AB is transmitted through OR gate 2 to AND gate 13 and, during the period that conductor T1 is energized, a signal is placed by AND gate 13 on its output conductor *b*B.

Referring now to FIG. 1, conductor *b*B is connected as one input to each of the AND gates 25. The other input of each of the AND gates 25 is connected to one of the conductors B1, B2, B3 or B4 of bus TB. The output of each of the AND gates 25 is connected to the SET terminal of one of the binary storage elements in register B. Consequently, when a signal is placed on conductor *b*B, the information on bus TB is gated through AND gates 25 into register B. For example, if as assumed above conductors B1 and B3 of bus TB are energized, the data word 1010 will be gated through AND gates 25 and entered into the binary storage elements of register B.

As noted above with respect to FIG. 2, the signal on conductor AB is transmitted through OR gates 2 and 3 and appears on conductor SEQG. This signal is applied to one input of AND gate 10. Conductor T1 is connected as the other input to AND gate 10. Accordingly, when conductor T1 is energized by sequencer SEQ, AND gate 10 places a signal on conductor SED. As shown in FIG. 1, conductor SED is connected to the SET terminal of error detector flip-flop ED. Therefore, when conductor SED is energized, flip-flop ED will be placed in a SET state.

Flip-flop ED will provide an indication as to the accuracy of the transmission of information between registers A and B as described below. Flip-flop ED will remain in its SET state if no transmission error is detected. However, if a transmission error is detected, flip-flop ED will be RESET and will generate a transmission error signal on conductor TE. This will be described in more detail below.

Sequencer SEQ now advances to its second active state, places a signal on conductor T2, and removes the signal from conductor T1. During the period of time that conductor T2 is energized by sequencer SEQ, the complement of the data contained in register A will be gated to the bus TB, the true value of the data contained in register B will be gated to the bus TB, and the conductors B1–B4 of bus TB will be examined to ascertain if any binary "0's" are represented by an absence of signals therefrom. If any binary "0's" are detected on bus TB, flip-flop ED will be RESET.

As indicated on FIG. 2, conductor AB is connected as an input to OR gate 1 and the output of OR gate 1 is connected as an input to AND gate 14. Consequently, the signal on conductor AB is transmitted through OR gate 1 and serves as one input to AND gate 14. Conductor T2 is connected as the other input to AND gate 14. Therefore, when sequencer SEQ places a signal on conductor T2, the signal on conductor AB is transmitted through AND gate 14. The output of AND gate 14 is connected as an input to OR gate 11. Accordingly, the output signal from AND gate 14 is transmitted through OR gate 11 to conductor $\bar{A}b$.

Referring now to FIG. 1, conductor $\bar{A}b$ is connected as one input to each of the AND gates 22. The other input of each of the AND gates 22 is connected to the complementary or "0" output terminals of the respective binary storage elements of register A. Consequently, when conductor $\bar{A}b$ is energized, signals will be placed on the conductors B1–B4 of bus TB by AND gates 22 which correspond to those binary storage elements of register A containing binary "0's." If as assumed above register A contains the word 1010, conductors B2 and B4 of bus TB will have signals placed thereon by the enabled AND gates 22.

The signal on conductor AB, as indicated in FIG. 2, is transmitted through OR gate 2 and appears as one input to AND gate 5. Conductor T2 is connected as the other input to AND gate 5. Accordingly, when conductor T2 is energized by sequencer SEQ, the signal on conductor AB is transmitted through OR gate 2 and AND gate 5 and appears as an input to OR gate 8. The output signal from AND gate 5 is transmitted through OR gate 8 and appears on its output conductor B*b*.

Conductor B*b*, as shown in FIG. 1, is connected as one input to each of the AND gates 23. The other input of each of the AND gates 23 is connected to the true or "1" output terminal of one of the respective binary storage elements of register B. Thus, when conductor B*b* is energized, AND gates 23 place signals on the conductors B1–B4 of bus TB corresponding to the binary storage elements of register B which contain binary "1's." If, as assumed above, the data word 1010 has been placed in register B, conductors B1 and B3 will be energized by AND gates 23.

At this time, a signal representing a binary "1" should be present on each of the conductors B1, B2, B3 and B4 of bus TB if the information contained in registers A and B is identical. If any of the conductors B1–B4 is not presently energized, the corresponding inverter 26 will place a signal on its output conductor which is connected to OR gate 27. Accordingly, if the data on data bus TB is not all binary "1's," an output signal will be provided from OR gate 27. Conductor T2 of FIG. 2 is connected as an input to OR gate 36 and the output of OR gate 36 is connected over conductor GA to AND gate 35 on FIG. 1. Accordingly, when a signal is present on conductor T2, this signal is transmitted through OR gate 36 and appears as an input signal to AND gate 35. The output of OR gate 27 is connected as the other input to AND gate 35. When conductor T2 is energized and an output signal is provided from OR gate 27, this output signal will be transmitted through AND gate 35 to the RESET terminal of error detector flip-flop ED. Therefore, during the time that conductor T2 is energized by sequencer SEQ, flip-flop ED will be placed in a RESET state if signals representing binary "1's" are not detected on all conductors B1–B4 of the data bus TB. This check of the information signals on data bus TB serves as a functional check on the output gates 22 associated with register A and the output gates 23 associated with register B. This check also verifies the capability of register B to retain data after the gating control signal has been removed from conductor *b*B.

Sequencer SEQ now advances to its third active state causing a signal to be placed on conductor T3 and causing the signal to be removed from conductor T2. During the time conductor T3 is energized by sequencer SEQ, the complement of the data contained in register B will be gated to data bus TB, the true value of the data contained in register A will be gated to the data bus TB, and the resulting information placed on data bus TB will be examined for the presence of any binary "0's". As described above with reference to the preceding sequence state of sequence SEQ, error detector flip-flop ED will be RESET if any binary "0's" are detected on data bus TB while a signal remains on conductor T3.

Referring to FIG. 2, conductor T3 is connected as one input to OR gate 4 and the output of OR gate 4 is connected to AND gate 6. Conductor T1, as previously noted, is connected as the other input to OR gate 4. Accordingly, a signal on conductor T3 has the same effect with reference to OR gate 4 that the previously described signal on conductor T1 had. Accordingly, as described earlier, when a signal is present on conductor T3 and a signal is present on conductor AB, conductor A*b* is energized with a gating control signal. In response to this gating control signal on conductor A*b*, the true value of the contents of register A is gated through AND gates 21 to the respective conductors B1–B4 of bus TB. As described earlier, if the contents of register A is assumed to be 1010, conductors B1 and B3 will have signals placed thereon by AND gates 21.

Conductor T3 also is connected as one input to AND gate 16. As described earlier, when a signal is present on conductor AB, it is transmitted through OR gate 2. The output of OR gate 2 is connected as the other input to AND gate 16. Accordingly, an output signal is provided by AND gate 16 when signals are present on both conductors T2 and AB. The output of AND gate 16 is connected as an input to OR gate 15. Accordingly, the output signal from AND gate 16 is transmitted through OR gate 15 and appears as a gating control signal on conductor $\bar{B}b$.

Referring to FIG. 1, conductor B*b* is connected as one input to each of the AND gates 24. The other input of each of the AND gates 24 is connected to the complementary or "0" output terminal of one of the respective binary storage elements of register B. Therefore, when a signal is present on conductor $\bar{B}b$, signals will be placed on the conductors B1–B4 of bus TB which correspond to those binary storage elements of register B which contain a binary "0." Assuming register B to contain the data word 1010, signals will be placed on conductors B2 and B4 of bus TB.

At this time, signals representing binary "1's" should be present on all conductors B1–B4 of bus TB. If a binary "1" is not represented on any one of the conductors B1–B4, a transmission error or a malfunction in the gating circuits has occurred.

In the same manner as conductor T2, conductor T3 is connected as an input to OR gate 36. Thus, when conductor T3 is energized, a gating signal is applied to AND gate 35 over conductor GA. As described above, inverters 26, OR gate 27 and AND gate 35 will provide a RESET signal to flip-flop ED if signals representing a binary "1" are not present on all of the conductors B1–B4 of bus TB. If error detector ED is placed in a RESET state, a transmission error signal is provided on conductor TE which is connected to the "0" output terminal of flip-flop ED.

As a result of the above-described gating and detection operations, both sets of output gates 21 and 22 associated with register A have been checked, both sets of output gates 23 and 24 associated with register B have been checked, the capability of register B to retain data after an input gating signal has been removed has been checked, the operation of input gates 25 associated with register B has been checked, and a complete match operation has been performed upon the contents of registers A and B.

Sequencer SEQ now advances to its fourth active state causing a signal to be placed on conductor T4 and the signal to be removed from conductor T3. During the time conductor T4 is energized by sequencer SEQ, and if no error has been detected, sequencer SEQ will be returned to its inactive initial state and the source register A will be RESET to a condition in which all binary storage elements thereof contain binary "0's."

If no error has been detected, flip-flop ED will remain in a SET state. If flip-flop ED remains SET, conductor NED connected to the "1" output of flip-flop ED will have a signal thereon. Referring now to FIG. 2, conductor NED is connected as one input to AND gate 9. Conductor T4 is connected as the other input to AND gate 9. Consequently, if signals are present on both conductors NED and T4, an output signal will be provided by AND gate 9. This output signal is applied from AND gate 9 over conductor RR to AND gate 12. The signal on conductor AB is transmitted through OR gate 1 and applied as the other input to AND gate 12. As a result, a control signal is applied by AND gate 12 to conductor RA. As indicated on FIG. 1, conductor RA is connected to the RESET terminal of each binary storage element of register A. As a result, each storage element of register A will be RESET to a binary "0" state when a signal is applied over conductor RA.

The aforenoted output signal from AND gate 9 also is applied over conductor RSEQ to sequencer SEQ. The signal on conductor RSEQ causes sequencer SEQ to advance from its fourth active state to its initial inactive state, thereby removing the signal from conductor T4.

With sequencer SEQ in its initial inactive state, the instruction signal on conductor AB can now be removed and a different data transfer operation can be initiated.

The above description of a data transfer operation between registers A and B is illustrative of the principles of this invention. The circuit arrangement shown in FIGS. 1 and 2 is capable of transferring data between any combination of source and destination registers. The logic employed in the arrangement of FIGS. 1 and 2 corresponds with the following Boolean equations:

$$Ab=(T1+T3)(AB+AC+AD)+T2(BA+CA+DA)$$
$$Bb=(T1+T3)(BA+BC+BD)+T2(AB+CB+DB)$$
$$Cb=(T1+T3)(CA+CB+CD)+T2(AC+BC+DC)$$
$$Db=(T1+T3)(DA+DB+DC+T2(AD+BD+CD)$$
$$bA=T1(BA+CA+DA)$$
$$bB=T1(AB+CB+DB)$$
$$bC=T1(AC+BC+DC)$$
$$bD=T1(AD+BD+CD)$$
$$\bar{A}b=T2(AB+AC+AD)+T3(BA+CA+DA)$$
$$\bar{B}b=T2(BA+BC+BD)+T3(AB+CB+DB)$$
$$\bar{C}b=T2(CA+CB+CD)+T3(AC+BC+DC)$$

$$\bar{D}b=T2(DA+DB+DC)+T3(AD+BD+CD)$$
$$RA=RR(BA+BC+BD)$$
$$RB=RR(BA+BC+BD)$$
$$RC=RR(CA+CB+CD)$$
$$RD=RR(DA+DB+DC)$$
$$RR=\text{RSEQ}=NED\cdot T4$$
$$NED=\text{Flip-Flop } ED \text{ SET}$$
$$TE=\text{Flip-Flop } ED \text{ RESET}$$
$$GA=T2+T3$$
$$SED=SEQG\cdot T1$$
$$SEQG=(BA+CA+DA)+(AB+CB+DB)+(AC+BC+DC)+(AD+BD+CD)$$

It is understood that the above-described arrangements are merely illustrative of the application of the principles of the invention. Numerous other arrangements may be devised by those skilled in the art without departing from the spirit and scope of the invention.

What is claimed is:

1. A data matching arrangement comprising
- a first register containing $n$ binary data bits,
- a second register containing $n$ binary data bits,
- first means for performing a logical OR function on the true value of said $n$ bits contained in said first register and the complementary value of said $n$ bits contained in said second register,
- second means for performing a logical OR function on the true value of said $n$ bits contained in said second register and the complementary value of said $n$ bits contained in said first register,
- control means for sequentially enabling said first and second OR function performing means, and
- means for detecting the presence of a binary "0" in the results of either of said performed logical OR functions.

2. A data matching arrangement in accordance with claim 1 wherein
- said first logical OR function performing means comprises
- a single-rail data transmission bus comprising $n$ bit transmission channels,
- gating means for transferring the true values of said $n$ bits contained in said first register to said $n$ channels, and
- gating means for transferring the complementary values of said $n$ bits contained in said second register to said $n$ channels; and
- said second logical OR function performing means comprises
  - said data transmission bus,
  - gating means for transferring the true values of said $n$ bits contained in said second register to said $n$ channels, and
  - gating means for transferring the complementary values of said $n$ bits contained in said first register to said $n$ channels.

3. A data matching arrangement in accordance with claim 2 wherein said detecting means comprises a bistable device whose state is changed when a binary "0" is present in the results of either of said performed logical OR functions.

4. A data matching arrangement in accordance with claim 3 wherein said control means is inhibited in accordance with the state of said bistable device.

5. A data transmission and error checking arrangement comprising
- a plurality of data registers each for storing $n$ bits of binary data;
- a data transmission bus comprising $n$ bit transmission channels for transmitting $n$ bits of data between selected of said registers on a single-rail basis;
- first gating means for each one of said registers for gating data stored in said one register onto said bus;
- second gating means for each one of said registers for gating the complement of data stored in said one register onto said bus;

third gating means for each one of said registers for gating data from said bus into said one register;

detecting means for detecting the presence of a predetermined binary value in any data on said bus;

control means responsive to a signal defining one of said registers as a source register and one of said registers as a destination register for selectively controlling said gating means;

said control means comprising first enabling means for simultaneously enabling said first gating means for said defined source register and said third gating means for said defined destination register, second enabling means for simultaneously enabling said first gating means for said defined source register, said second gating means for said defined destination register and said detecting means, third enabling means for simultaneously enabling said first gating means for said defined destination register, said second gating means for said defined source register and said detecting means, and sequence control means responsive to said signal for sequentially energizing said first, second and third enabling means;

indicating means controlled by said detecting means for indicating an error when said predetermined binary value is detected by said detecting means.

6. A data transmission arrangement comprising a plurality of data registers, a single-rail data bus for transmission data between selected of said registers, selecting means for defining one of said registers as a source register and one of said registers as a destination register, means controlled by said selecting means for transferring data from said defined source register to said bus and for transferring said data from said bus to said defined destination register, first means including said bus and controlled by said selecting means for performing a logical OR function on the true value of data contained in said defined source register and the complementary value of data contained in said defined destination register, second means including said bus and controlled by said selecting means for performing a logical OR function on the true value of said data contained in said defined destination register and the complementary value of said data contained in said source register.

control means responsive to said selecting means for sequentially enabling said first and second OR function performing means, and means for detecting the presence of a binary "0" in the results of either of said performed logical OR functions.

7. A data transmission and error checking arrangement comprising a first data register for storing data in binary form;

a second data register for storing data in binary form;

transmitting means including a data transmission bus for transmitting data between said registers on a single-rail basis;

first gating means for each one of said registers for gating signals representing the true value of data stored in said one register onto said bus;

second gating means for each one of said registers for gating signals representing the complementary value of data stored in said one register onto said bus;

detecting means for detecting the presence of signals representing binary "0's" on said bus;

first enabling means for simultaneously enabling said first gating means for said first register, said second gating means for said second register and said detecting means;

second enabling means for simultaneously enabling said first gating means for said second register, said second gating means for said first register and said detecting means;

control means for sequentially energizing said transmitting means, said first enabling means and said second enabling means; and indicating means responsive to said detecting means for indicating an error when a binary "0" signal is detected by said detecting means.

References Cited

UNITED STATES PATENTS

| | | | |
|---|---|---|---|
| 3,137,839 | 6/1964 | Rubin | 340—146.2 |
| 3,139,523 | 6/1964 | Luke | 340—146.2 X |

EUGENE G. BOTZ, Primary Examiner

R. S. DILDINE, Jr., Assistant Examiner

U.S. Cl. X.R.

340—146.2